United States Patent
Ishimoto

(10) Patent No.: US 6,882,370 B2
(45) Date of Patent: Apr. 19, 2005

(54) SOLID-STATE IMAGE PICKUP APPARATUS

(75) Inventor: Kazuo Ishimoto, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 634 days.

(21) Appl. No.: 10/042,640

(22) Filed: Jan. 8, 2002

(65) Prior Publication Data
US 2002/0089594 A1 Jul. 11, 2002

(30) Foreign Application Priority Data
Jan. 9, 2001 (JP) .................................... 2001-001302

(51) Int. Cl.$^7$ ............................................. H04N 5/225
(52) U.S. Cl. ...................................... 348/372; 348/296
(58) Field of Search ........................ 348/207.99, 220.1, 348/294, 296, 297, 298, 311, 312, 316, 317, 320, 322; 327/534; 600/109

(56) References Cited
U.S. PATENT DOCUMENTS

| 5,777,508 | A | * | 7/1998 | Sawanobori | ................ 327/534 |
| 2002/0008773 | A1 | * | 1/2002 | Akizuki et al. | ............. 348/371 |
| 2004/0073086 | A1 | * | 4/2004 | Abe | ............................ 600/109 |
| 2004/0201716 | A1 | * | 10/2004 | Sakaegi | ................... 348/220.1 |

* cited by examiner

Primary Examiner—Tuan Ho
(74) Attorney, Agent, or Firm—Hogan & Hartson, LLP

(57) ABSTRACT

A solid-state image pickup apparatus is provided having a solid-state image pickup device for generating an information charge in response to an image of which light was received, a drive circuit for transferring the information charge accumulated in the solid-state image pickup device, and outputting the information charge, a power supply for generating a predetermined voltage in accordance with an input amount of voltage booster pulses and supplying the predetermined voltage to the solid-state image pickup device and the drive circuit and a pulse generator circuit for generating and supplying the voltage booster pulses to the power supply. The pulse generator circuit stops generation of the voltage booster pulses in accordance with a termination of an information charge readout operation of one screen pickup period from the image pickup device, and when the drive circuit executes an electronic shutter operation, which discharges the information charge that has accumulated in the solid-state image pickup device to resume accumulation, the voltage booster pulses are generated over a predetermined voltage booster period prior to the electronic shutter operation at a higher frequency than the information charge readout operation to boost the voltage of the power supply.

12 Claims, 4 Drawing Sheets

SOLID-STATE IMAGE PICKUP APPARATUS

BACKGROUND OF THE INVENTION

1. Field of the Invention

The present invention relates a solid-state image pickup apparatus, and more particularly to reducing the power consumption of the solid-state image pickup apparatus.

2. Description of the Prior Art

A camera using a charge coupled device (CCD) image sensor, namely, a digital still camera, comprises in addition to the CCD image sensor, a driver for driving the CCD image sensor and a processor for executing various types of processing on the output of the CCD image sensor, as well as a display for displaying the image screen and a memory for storing image signals as data. This type of digital still camera is often driven by battery so that among the various parts comprising the digital still camera, a component not used constantly is shut down during unused periods to reduce power consumption.

Having a driving voltage that is higher compared to an ordinary semiconductor, the CCD image sensor is provided with a voltage booster circuit to boost the battery voltage and generate a driving voltage for the CCD image sensor. Regarding the driver for driving the CCD sensor with pulses, the same voltage booster circuit is used to generate driving pulses having a sufficient voltage. The voltage booster circuit is configured, for example, so that the power supply voltage is superimposed by a pulse-driven charge pump to yield a desired voltage.

The voltage booster circuit supplying power to the CCD image sensor and the driver determines the frequency of the driving pulses so that a predetermined power can be supplied, and continues the voltage boosting operation during the period of operation of the digital still camera. Namely, during the period in which the digital still camera continues operation, the voltage booster circuit, which is the power supply for the CCD image sensor and the driver, continues to operate to keep the CCD image sensor operating. Continuing the operation of the voltage booster circuit, which requires high frequency driving pulses, causes the power consumption to increase.

SUMMARY OF THE INVENTION

It is therefore an object of the present invention to reduce even further the power consumption of the digital still camera by reducing the power consumption of the above-mentioned voltage booster circuit.

The image pickup apparatus relating to one aspect of the present invention comprises a solid-state image pickup device for generating an information charge in response to an image of which light was received, a drive circuit for transferring the information charges accumulated in the solid-state image pickup device, and outputting the information charge, a power supply for generating a predetermined voltage in accordance with the input amount of voltage booster pulses and supplying the voltage to the solid-state image pickup device and the drive circuit, and a pulse generator circuit for generating and supplying the voltage booster pulses to the power supply. The pulse generator circuit stops the generation of the voltage booster pulses in accordance with the termination of the information charge readout operation of one screen pickup period from the solid-state image pickup device, and when the drive circuit executes the electronic shutter operation, which discharges the information charge that has accumulated in the solid-state image pickup device to resume the accumulation, the voltage booster pulses are generated over a predetermined voltage booster period prior to the electronic shutter operation at a higher frequency than the readout period to boost the voltage of the power supply.

The electronic shutter operation is known as a technique for adjusting the exposure time of the solid-state image pickup device. In the electronic shutter operation, the information charge that has accumulated in the light receiving pixel until that time is discharged, from which point the accumulation resumes. Then, when an exposure ends and the information charge is completely read out from the solid-state image pickup device, the operation of one image pickup period (for example, one field in interlace scanning or one frame in non-interlace scanning) substantially ends. Namely, in the period from the termination of the information charge readout period until the next electronic shutter operation, the solid-state image pickup device basically does not require drive pulses. According to the present invention, in the period where the solid-state image pickup device does not require drive pulses, the drive system of the solid-state image pickup device is stopped to reduce the power consumption during this period. A DC—DC converter is known, for example, as a driving power supply that generates a voltage in accordance with the input amount of voltage booster pulses. This power supply outputs a voltage corresponding to a value resulting from the input amount of voltage booster pulses integrated at a predetermined time constant. Namely, when the supply of voltage booster pulses is stopped, the output voltage of the power supply drops and the driver driving the solid-state image pickup device stops. On the other hand, when the supply of voltage booster pulses is initiated, the output voltage rises and the driver begins to operate. In the present invention, the voltage booster pulse generator circuit stops in accordance with the termination of the information charge readout operation. As a result, the voltage of the power supply gradually drops so that the power consumption at the solid-state image pickup device can be suppressed until the voltage booster pulse generator circuit again initiates the generation of voltage booster pulses. On the other hand, at the time when the electronic shutter operation is performed, it is necessary for the power supply to attain a target level, which is the normal level. Then, prior to the electronic shutter, the operation of the voltage booster pulse generator circuit is initiated to raise the output voltage of the power supply to the normal level. In particular, in the voltage booster period prior to the electronic shutter operation, the generation frequency of the voltage booster pulses is increased. By placing the voltage booster pulses in the ON state, for example, the output voltage of the power supply can be raised rapidly.

In accordance with the exposure condition at an arbitrary screen pickup period, the solid-state image pickup apparatus relating to the second aspect of the present invention sets a shutter timing for performing the electronic shutter operation at a subsequent screen pickup period and sets a start timing is set for starting to performing the voltage boosting operation prior to the shutter timing by a predetermined time at least as long as the voltage booster period.

According to the present invention, a predetermined time from the start of voltage boosting operation until the electronic shutter operation is set beforehand. During this time the voltage can be boosted to a target level and includes the voltage booster period, which is a generation period at a high frequency of the above-mentioned voltage booster pulses, so that it is set at least as long as the voltage booster period. The timing of the electronic shutter operation is set at least as long as the prior voltage booster period. The timing of the electronic shutter operation can be set on the basis of the exposure condition of the prior image pickup. Namely, when the signal of the prior image is read out, it is the basis on which the exposure condition is detected and the next shutter timing is set. At this timing, for example, the electronic shutter operation can be controlled by generating an electronic shutter trigger pulse. Furthermore, a timing that precedes the shutter timing by a predetermined time that was set beforehand as described above is set as the start timing of the voltage boosting operation. After this timing, for example, consecutive voltage booster pulses in the above-mentioned voltage booster period are supplied to the power supply.

The solid-state image pickup apparatus relating to the third aspect of the present invention uses a shutter trigger pulse having a predetermined pulse width at least as long as the voltage booster period. The voltage boosting operation is initiated in connection with the timing of the leading edge of the shutter trigger pulse, and the electronic shutter operation is initiated in connection with the timing of the trailing edge of the shutter trigger pulse.

According to the present invention, using one shutter trigger pulse defines the shutter timing and the start timing of the voltage boosting operation. For example, the shutter trigger pulse is supplied to the image pickup apparatus so that the external system controls the shutter timing. In such an instance, the image pickup apparatus cannot predict the time of the shutter timing, and furthermore also cannot predict the start timing of the voltage boosting operation, which precedes it by a predetermined time. Thus, it is necessary for the start timing of the voltage boosting operation to be also provided by the external system. According to the present invention, these two timings can be controlled by one pulse.

When the start timing of the voltage boosting operation precedes the termination of the readout period of the information charge, the image pickup apparatus relating to the fourth aspect of the present invention prohibits the stop operation for the voltage booster pulse generator circuit.

According to the present invention, the power consumption from the stop timing until the start timing of the voltage booster pulse generator circuit is reduced. However, depending on the shutter timing, there are instances where the start timing precedes the stop timing. In such an instance, the stopping of the voltage booster pulses is inhibited so that the voltage of the target level is output from the power supply in both the information charge readout operation and the electronic shutter operation.

DETAILED DESCRIPTION OF THE PREFERRED EMBODIMENTS

Embodiments of the present invention will be described hereinafter with reference to the drawings.

[Embodiment 1]

Figure 1:
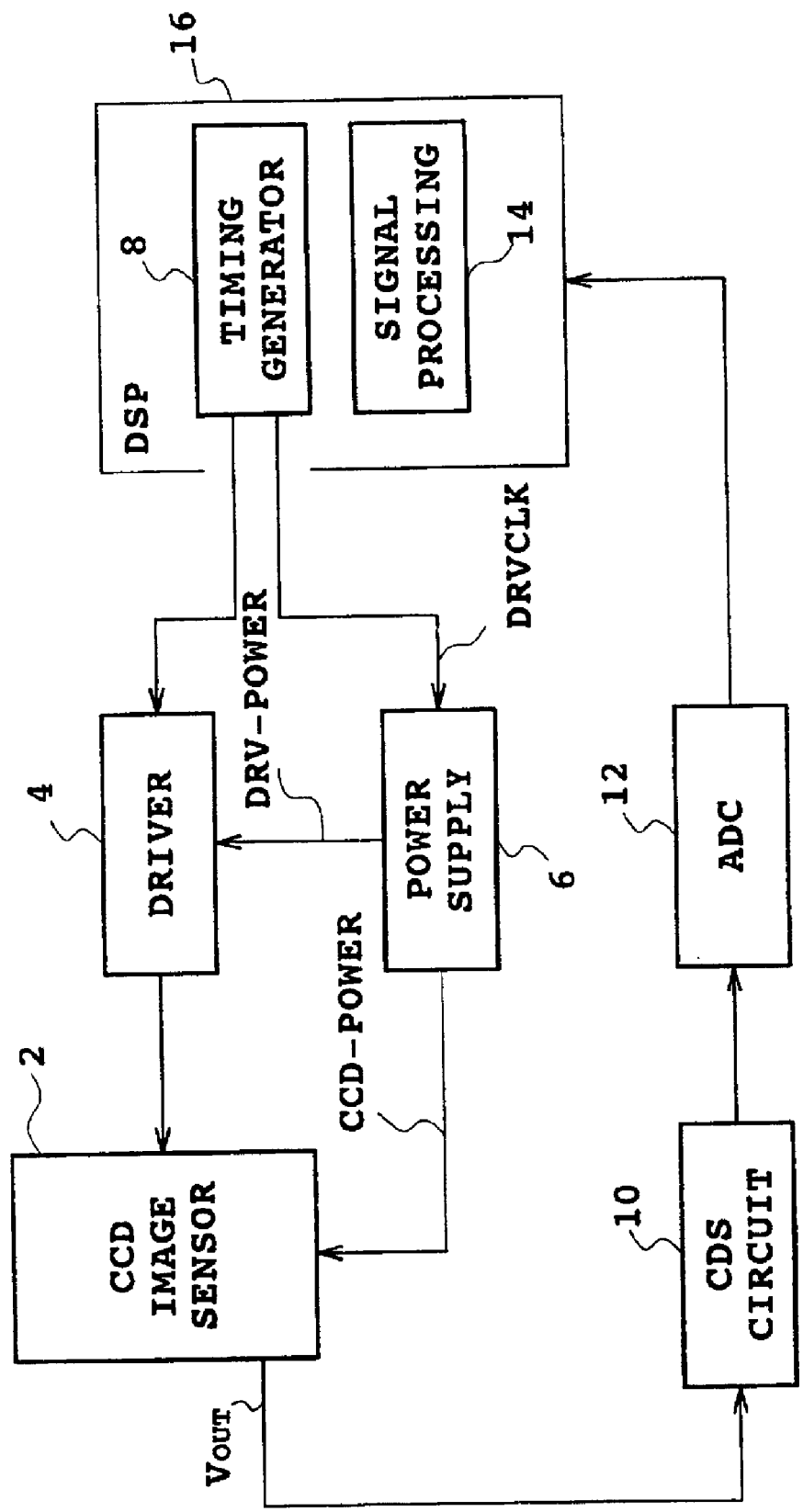
FIG. 1 is a simplified block diagram of the solid-state image pickup apparatus relating to the first embodiment.

FIG. 1 is a simplified block diagram of a digital still camera depicting the solid-state image pickup apparatus of the present invention. The apparatus includes a CCD image sensor 2, which is a solid-state image pickup device, a driver 4 for generating various types of pulses to drive the CCD image sensor 2, a power supply 6 for generating a voltage necessary for the operation of the driver 4, a timing generator 8 for supplying control pulses to the driver 4 and the power supply 6, a CDS (Correlated Double Sampling) circuit 10 for performing correlated double sampling on an output signal $V_{out}$ of the CCD image sensor 2, an ADC (Analog-to-Digital Converter) 12 for converting the output signal of the CDS circuit 10 to a digital signal, and a signal processing circuit 14 for performing various types of digital processing on the output signal of the ADC 12. The CCD image sensor 2 described here is of the frame transfer type.

The power supply 6 boosts the voltage by performing a charge pump operation with voltage booster pulses that are input from the timing generator 8. As a result, the power supply 6 outputs to the CCD image sensor 2 and the driver 4 a voltage corresponding to a value integrating the amount of input of the voltage booster pulses at a predetermined time constant. On the other hand, the output voltage of the power supply 6 drops when the supply of voltage booster pulses stops. The power supply 6 is configured, for example, by using a DC—DC converter.

The timing generator 8 and the signal processing circuit 14 are configured, for example, by using a digital signal processor (DSP) 16. The timing generator 8 provides timing pulses to the driver 4 at a programmed timing. The driver 4 generates and outputs pulses to drive the CCD image sensor 2 in accordance with the timing pulses from the timing generator 8. Furthermore, the timing generator 8 supplies DRVCLK voltage booster pulses to the power supply 6 as described earlier.

Figure 2:
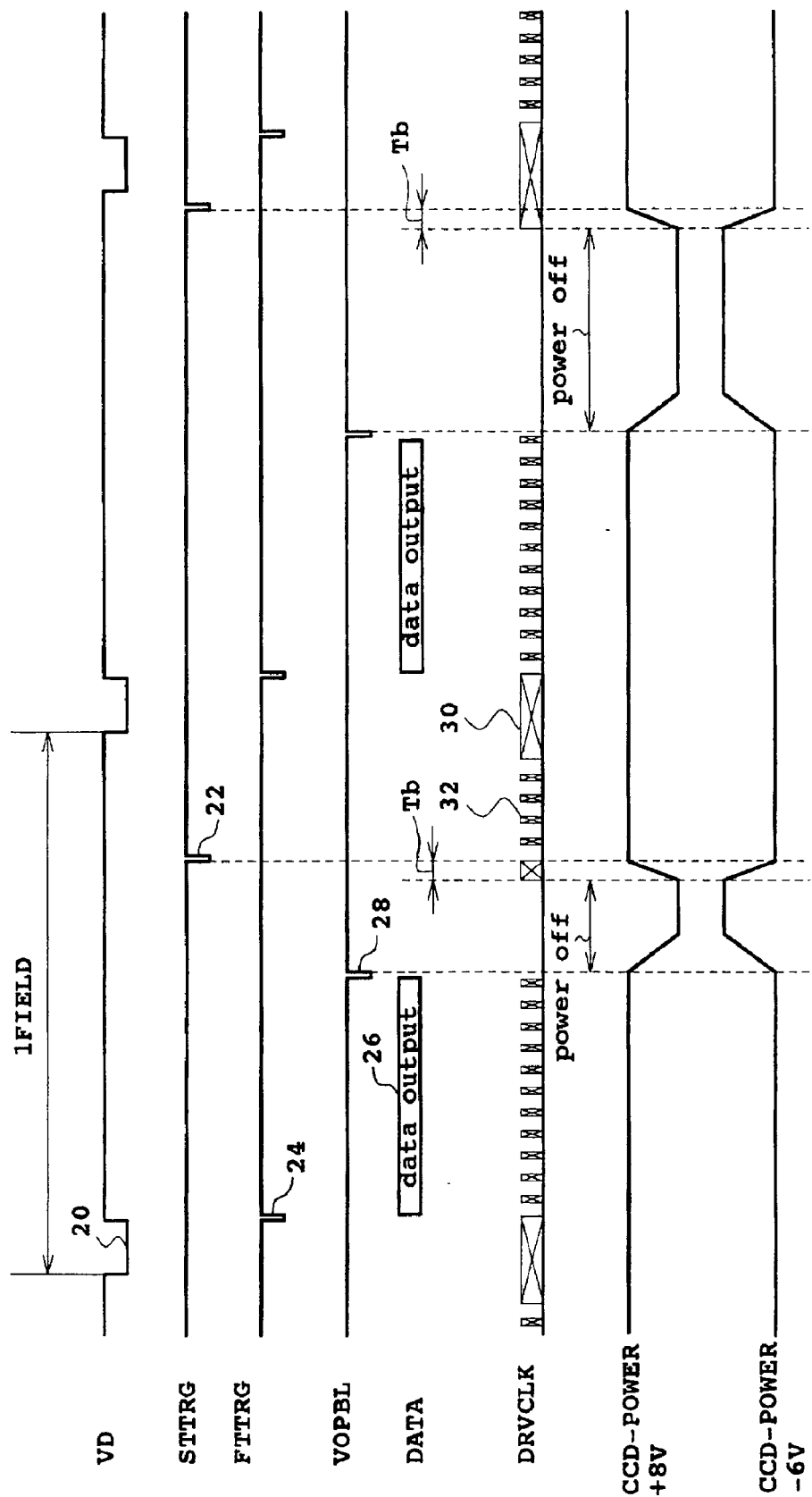
FIG. 2 is a timing chart illustrating the operation of the solid-state image pickup apparatus relating to the first embodiment.

FIG. 2 is a timing chart illustrating the operation of the apparatus. In the figure, the signal VD is a vertical synchronization signal. A period 20 during which VD is low (L) represents a vertical blanking period, and the period of vertical blanking corresponds to one field.

Signal STTRG is a signal providing a shutter trigger pulse (STTRG pulse) 22, and the pulse 22 determines the timing of the electronic shutter operation.

Signal FTTRG is a signal providing a frame shift trigger pulse (FTTRG pulse) 24, and the pulse 24 determines the timing of the frame shift. Corresponding to the fact that the frame shift is performed within the vertical blanking period, the FTTRG pulse 24 is also generated in the vertical blanking period.

Signal DATA is an image signal that is output from the ADC 12. Furthermore, VOPBL is a signal providing a flag pulse 28 to indicate that an output period 26 of the image signal has terminated.

Furthermore, signal DRVCLK is a signal providing the voltage booster pulses as described earlier. Since an operation is performed in the vertical blanking period, such as frame shift, the power consumption of the driver 4 is large. Thus, the timing generator 8 consecutively generates voltage booster pulses in the vertical blanking period to ensure an amount of current to be supplied to the diver 4. Furthermore, so that noise is not created in the output signal of the CCD image sensor 2, the voltage booster pulses are stopped in the horizontal scanning period and consecutively generated in the horizontal blanking period. In FIG. 2, a signal waveform 30 represents a voltage booster pulse group that is generated in accordance with the vertical blanking period, and a signal waveform 32 represents a voltage booster pulse group that is generated in accordance with the horizontal blanking period.

The voltage of the power supply 6 is boosted by the voltage booster pulses as described above. The power supply 6 respectively supplies during normal operation to the driver 4 an output DRV-POWER including, for example, a predetermined positive voltage (+8V) and a negative voltage (−6V). Simultaneously, the power supply 6 supplies an output CCD-POWER of predetermined voltages to the CCD image sensor 2 in accordance with the driving voltage of the driver 4.

The timing generator 8 sets the flag pulse 28 in the VOPBL signal when the control operation for reading out the information charge at an arbitrary field from the CCD image sensor 2 is completed. Then, in connection with the setting of the flag 28, the timing generator 8 stops the generation of the DRVCLK voltage booster pulses.

When the supply of voltage booster pulses is stopped, the output voltage of the power supply 6 gradually drops. Namely, after the voltage booster pulses are stopped, the two CCD-POWER voltages become 0V and the operation of the driver 4 stops. This also basically stops the power consumption of the driver 4.

The signal processing circuit 14 detects the amount of exposure of each field by integrating the luminance signal of the respective field on the basis of the output of the ADC 12. The timing generator 8 then obtains the position of the STTRG pulse 22 for the next field on the basis of the detected exposure amount so that the exposure amount for the next field falls within a predetermined optimum range. More specifically, if the detected exposure amount at the most recent field is excessive, for example, the timing of the STTRG pulse 22 for the next field is delayed from the timing at the present field and the exposure period is shortened. Vice versa, if the exposure amount is insufficient, the timing of the STTRG pulse 22 is advanced.

To perform an electronic shutter operation at the CCD image sensor 2, it is necessary to start the driver 4 that has been stopped in connection with the termination of the information charge readout period. Namely, the generation of the DRVCLK voltage booster pulses by the timing generator 8 is resumed, the output voltage of the power supply 6 is boosted, and the operation of the driver 4 is initiated.

A predetermined rise time is required for the power supply 6 to reach a voltage for normal operation. To shorten the rise time in the present apparatus, the DRVCLK voltage booster pulses are consecutively generated once generation is resumed. Namely, an intermittent generation method is adopted in the information charge readout period where the voltage booster pulses are generated in the horizontal blanking period and stopped in the horizontal scanning period. By contrast, in the voltage boosting at re-initialization, the voltage booster pulses are consecutively generated over a time at least as long as the horizontal blanking period. Thus, the output voltage of the power supply 6 is rapidly raised to a normal level.

The time required for the rise is determined by such factors as the capacitor in the power supply, the load, and so forth. The time required to rise to a normal level when the voltage booster pulses are consecutively generated is defined here as the voltage booster period $T_b$. The DSP 16 includes a register, to which is set beforehand the above-mentioned value $T_b$ of the voltage booster period. With respect to the timing of the STTRG pulse 22 that was determined as described above, the DSP 16 obtains a timing that is negatively offset only by $T_b$, which was set in the register. When the arrival of the timing is detected, the consecutive generation of the voltage booster pulses by the timing generator 8 is initiated. The consecutive generation of the voltage booster pulses continues only for voltage booster period $T_b$. As a result, the voltage of the power supply 6 is boosted to a normal level at the timing generated by the STTRG pulse 22.

The timing of the STTRG pulse that is generated within a given field and the voltage booster period $T_b$ are already known before the termination of the information charge readout period within that field. Thus, before termination of the information charge readout operation, the DSP 16 can calculate the start timing of the voltage boosting operation that has been negatively offset only by the voltage booster period $T_b$ from the generated timing of the STTRG pulse. If the start timing of the voltage boosting operation that was calculated by the DSP 16 precedes the termination of the information charge readout operation, which is the stop timing of the voltage booster pulses, the output voltage of the power supply 6 is maintained at a normal level without stopping the voltage booster pulses.

The present apparatus in this manner stops the supply of power from the power supply 6 during the period in which the CCD image sensor 2 is not driven, and stops the driver 4. As a result, the power consumption required to drive the CCD image sensor 2 is suppressed. Basically, when the image pickup apparatus picks up a moving image, the information charge readout operation within one field, the electronic shutter operation, its subsequent exposure operation, and the voltage boosting operation are performed so that the driver 4 can be stopped to reduce power consumption during the time remaining after these operating times are subtracted from the period of one field. Furthermore, when a still image is picked up, the image pickup interval is generally larger compared to the one field (or one frame) for the image pickup interval for the moving image, so in this instance the power consumption required to drive the CCD image sensor 2 is considerably suppressed.

[Embodiment 2]

In the following description of the second embodiment of the present invention, an identical component with that in embodiment 1 is given an identical reference numeral and its description is omitted.

Figure 3:
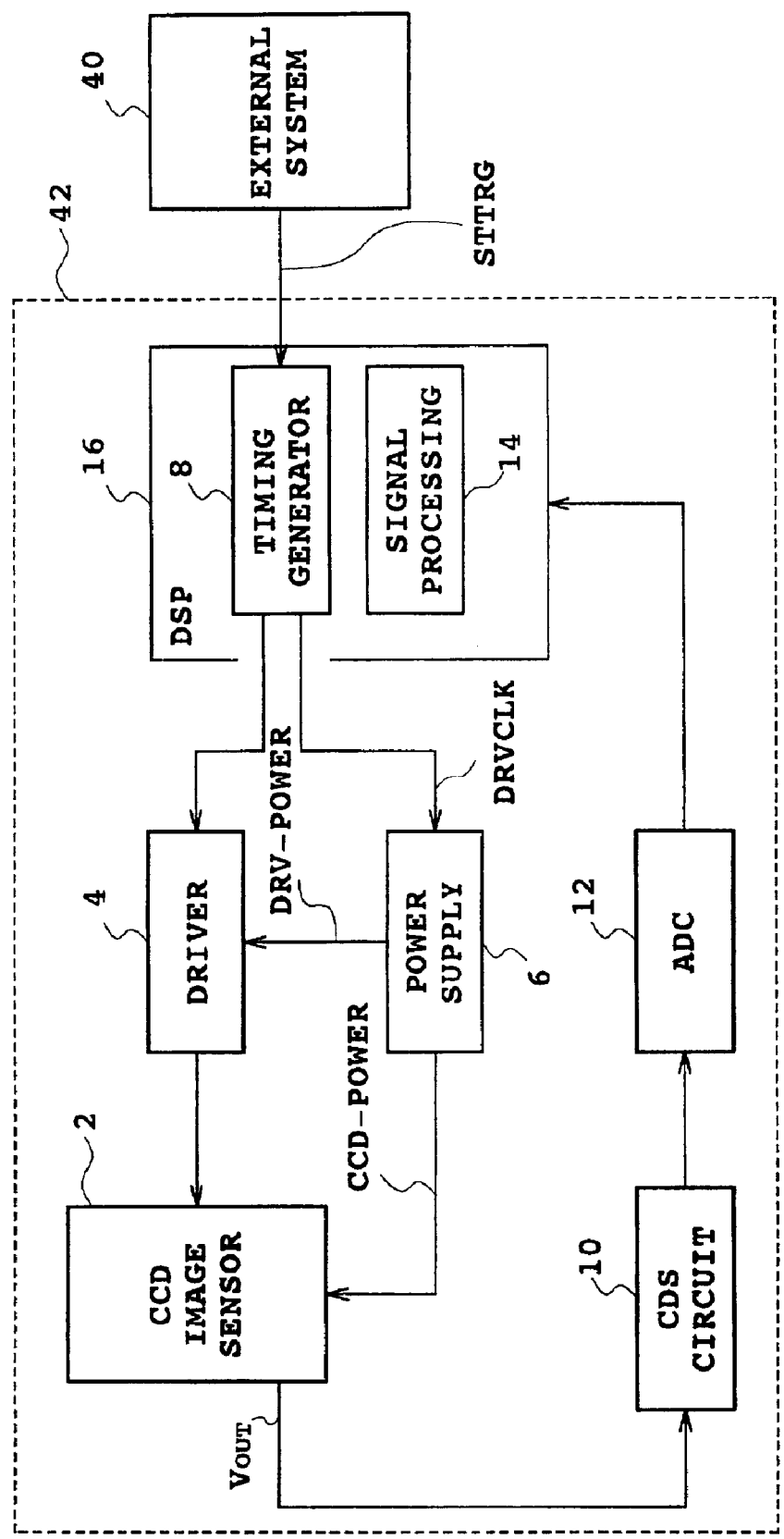
FIG. 3 is a simplified block diagram of the solid-state image pickup apparatus relating to the second embodiment.

FIG. 3 is a simplified block diagram of a digital still camera depicting the solid-state image pickup apparatus of the present invention. In this system, an external system 40 generates the STTRG pulse to control the electronic shutter operation in an image pickup apparatus 42.

Figure 4:
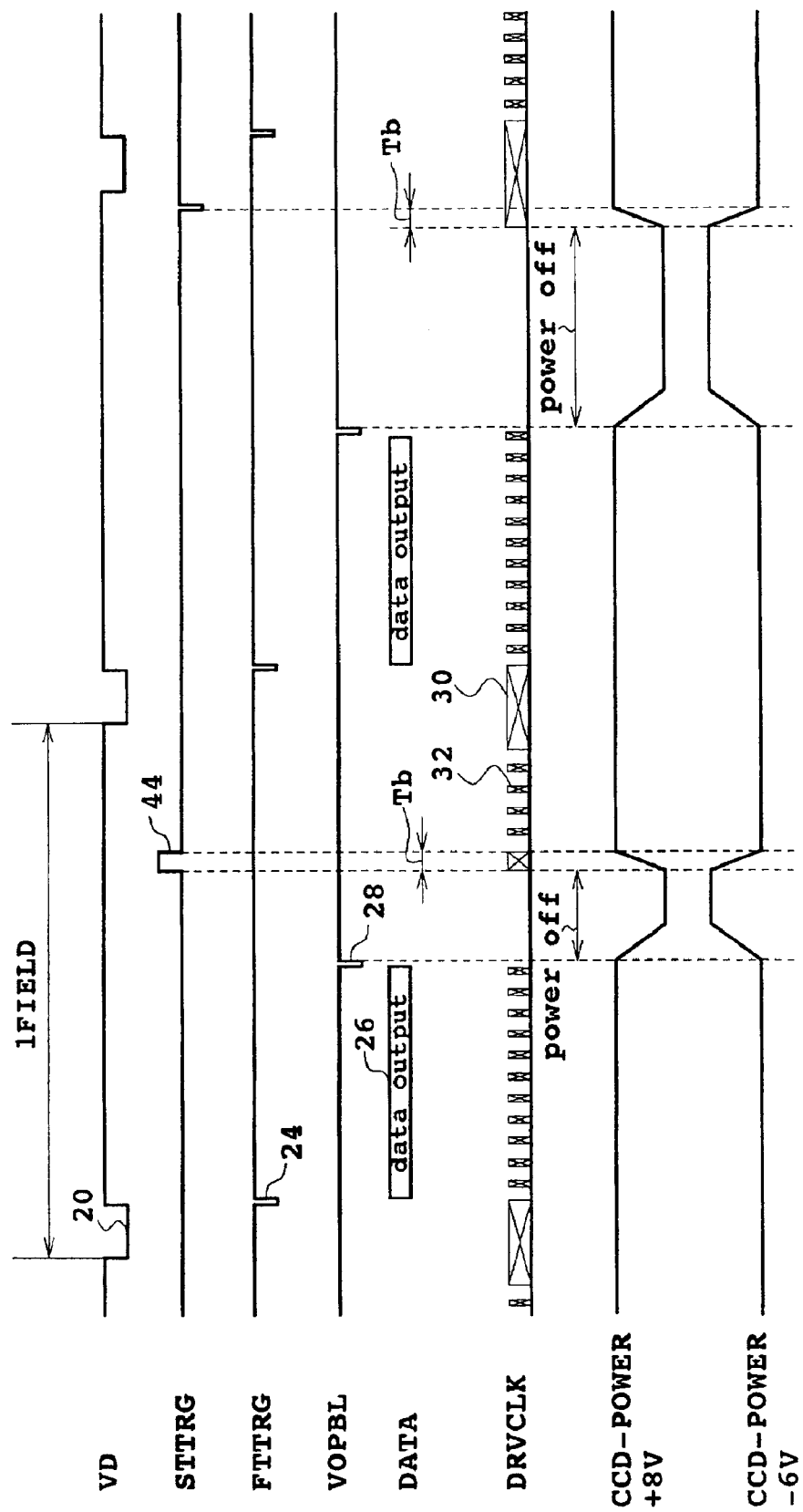
FIG. 4 is a timing chart illustrating the operation of the solid-state image pickup apparatus relating to the second embodiment.

FIG. 4 is a timing chart illustrating the operation of the apparatus. The signal STTRG from the external system 40 is input by the timing generator 8 as described above. The external system 40 generates a STTRG pulse 44 in the signal STTRG. The STTRG pulse 44 becomes the timing for initializing the electronic shutter operation at its trailing edge or falling edge, and is generated so that the pulse width assumes the voltage booster period $T_b$ as described in the above-mentioned embodiment.

As in the above-mentioned embodiment, the timing generator 8 stops the generation of the DRVCLK voltage booster pulses at the termination of the information charge readout operation. Then, when the STTRG pulse 44 is input, its leading edge or rising edge is detected and the generation of the DRVCLK voltage booster pulses is resumed so that the DRVCLK voltage booster pulses are consecutively generated only during the voltage booster period $T_b$. Since the termination of the voltage booster period is at the trailing edge of the STTRG pulse 44, when the timing generator 8 detects the trailing edge of the STTRG pulse 44, the voltage booster pulses are switched to be intermittently generated with period 1H in the information charge readout operation and the driver 4 is simultaneously driven to perform the electronic shutter operation.

In the image pickup apparatus of the above-mentioned embodiment, the operational timing of the electronic shutter is generated internally by the DSP 16 on the basis of the exposure condition of the previous field so that on the basis of this timing, the start timing of the voltage boosting operation preceding this timing could also be generated internally by the DSP 16. On the other hand, in the present apparatus, the operational timing of the electronic shutter is indicated by the external system 40 so that the start timing of the voltage boosting operation preceding this timing cannot be generated by the DSP 16. Thus, the start timing of the voltage boosting operation is provided by the external system 40. In this apparatus, the timings for the electronic shutter and the voltage booster start operation can be provided by one STTRG pulse 44 generated by the external system 40.

For example, when the external system 40 detects an object at a predetermined position within the image pickup area of the image pickup apparatus, it instructs the image pickup apparatus to pick up the image. More specifically, in the image pickup of an object on a belt conveyor, the external system 40 detects when the object has reached a position in front of the image pickup apparatus, then outputs the STTRG pulse 44. As a result, exposure is performed just when the object reaches a position in front of the image pickup apparatus so that the desired object is always captured in the center of each image.

According to the driving method of the solid-state image pickup apparatus of the present invention, the drive circuit is stopped during a period in which the solid-state image pickup device is not driven, from the termination of the information charge readout operation until the electronic shutter operation, so as to effectively reduce power consumption. During the period in which the drive circuit is stopped, it is preferable to stop the current flowing to the circuit although it is also effective to reduce the amount of current flow.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A solid-state image pickup apparatus comprising:
    a solid-state image pickup device for generating an information charge in response to an image of which light was received;
    a drive circuit for transferring the information charge accumulated in the solid-state image pickup device, and outputting the information charge;
    a power supply for generating a predetermined voltage in accordance with an input amount of voltage booster pulses and supplying the predetermined voltage to the solid-state image pickup device and the drive circuit; and
    a pulse generator circuit for generating and supplying the voltage booster pulses to the power supply;
    wherein the pulse generator circuit stops generation of the voltage booster pulses in accordance with a termination of an information charge readout operation of one screen pickup period from the image pickup device, and when the drive circuit executes an electronic shutter operation, which discharges the information charge that has accumulated in the solid-state image pickup device to resume accumulation, the voltage booster pulses are generated over a predetermined voltage booster period prior to the electronic shutter operation at a higher frequency than the information charge readout operation to boost the voltage of the power supply.

2. The solid-state image pickup apparatus according to claim 1 wherein:
    a shutter timing is set for performing the electronic shutter operation at a subsequent screen pickup period in accordance with an exposure condition in an arbitrary image pickup period; and
    a start timing is set for starting to performing the voltage boosting operation prior to the shutter timing by a predetermined time at least as long as the voltage booster period.

3. The solid-state image pickup apparatus according to claim 1 wherein:
    a shutter trigger pulse having a predetermined pulse width at least as long as the voltage booster period is used;
    the voltage boosting operation is initiated in connection with a timing of a leading edge of the shutter trigger pulse; and
    the electronic shutter operation is initiated in connection with a timing of a trailing edge of the shutter trigger pulse.

4. The solid-state image pickup apparatus according to claim 1 wherein:
    the stop operation of the voltage booster pulse circuit is prohibited when a start timing of the voltage boosting operation precedes the termination of the readout period of the information charge.

5. The solid-state image pickup apparatus according to claim 1, wherein the one screen pickup period is one field in interlace scanning.

6. The solid-state image pickup apparatus according to claim 1, wherein the one screen pickup period is one frame in non-interlace scanning.

7. A method for supplying the power to a solid-state image pickup apparatus comprising:
    generating an information charge in response to an image of which light was received and accumulating the information charge in a solid-state device;
    transferring and outputting the information charge accumulated in the solid-state device;
    generating a predetermined voltage in accordance with an input amount of voltage booster pulses and supplying the predetermined voltage to the solid-state image pickup device and a drive circuit;
    generating and supplying the voltage booster pulses to a power supply;
    stop generating the voltage booster pulses in accordance with a termination of an information charge readout operation of one screen pickup period from the image pickup device; and
    executing an electronic shutter operation, which discharges the information charge that has accumulated in the solid-state image pickup device to resume the accumulation such that voltage booster pulses are generated over a predetermined voltage booster period prior to the electronic shutter operation at a higher frequency than the information charge readout operation to boost the voltage of the power supply.

8. The method according to claim 7 further comprising:

setting a shutter timing for performing the electronic shutter operation at a subsequent screen pickup period in accordance with an exposure condition in an arbitrary image pickup period; and setting a start timing for starting to perform the voltage boosting operation prior to the shutter timing by a predetermined time at least as long as the voltage booster period.

9. The method according to claim 7 further comprising:

using a shutter trigger pulse baying a predetermined pulse width at least as long as the voltage booster period;

initiating the voltage boosting operation in connection with a timing of a leading edge of the shutter trigger pulse; and initiating the electronic shutter operation in connection with a timing of a trailing edge of the shutter trigger pulse.

10. The method according to claim 7 further comprising:

prohibiting the stop operation of the voltage booster pulse when a start timing of a voltage boosting operation precedes the termination of the readout period of the information charge.

11. The method according to claim 7 further comprising using one field in interlace scanning as the one screen pickup period.

12. The method according to claim 7 further comprising using one frame in non-interlace scanning as the one screen pickup period.

* * * * *